United States Patent
Chang (10) Patent No.: US 10,558,419 B2
(45) Date of Patent: Feb. 11, 2020

(54) VIDEO ADAPTER FOR INSTALLING VIDEO WALL AND RELATED METHOD

(71) Applicant: ATEN International Co., Ltd., New Taipei (TW)

(72) Inventor: Li-Jen Chang, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 15/652,672

(22) Filed: Jul. 18, 2017

(65) Prior Publication Data

US 2018/0024801 A1   Jan. 25, 2018

(30) Foreign Application Priority Data

Jul. 22, 2016   (TW) .............................. 105123295 A (51) Int. Cl.
*G06F 3/14*      (2006.01)
*H04L 27/00*   (2006.01)
*G06F 13/40*   (2006.01)

(52) U.S. Cl.
CPC ........ *G06F 3/1446* (2013.01); *G06F 13/4022* (2013.01); *G06F 13/4081* (2013.01); *G09G 2370/042* (2013.01)

(58) Field of Classification Search
None
See application file for complete search history.

(56) References Cited

U.S. PATENT DOCUMENTS

| | | | |
|---|---|---|---|
| 2003/0212811 A1* | 11/2003 | Thornton | ............... G06F 3/1431 709/231 |
| 2004/0015597 A1 | 1/2004 | Thornton | |
| 2004/0080482 A1 | 4/2004 | Magendanz et al. | |
| 2006/0284828 A1 | 12/2006 | Gerner | |

(Continued)

FOREIGN PATENT DOCUMENTS

| | | |
|---|---|---|
| JP | 2004-152303 A | 5/2004 |
| JP | 2008-164986 A | 7/2008 |

(Continued)

OTHER PUBLICATIONS

Taiwanese Office Action, dated Dec. 27, 2017, in a counterpart Taiwanese patent application, No. TW 105123295.

(Continued)

*Primary Examiner* — Carl Adams
(74) *Attorney, Agent, or Firm* — Chen Yoshimura LLP (57) ABSTRACT

The present invention discloses a video adapter for installing video wall quickly. The video adapter includes a microcontroller unit; a number generating unit coupled to the microcontroller unit to set a number for one display in the video wall and transmit the number to the microcontroller unit; a first connector coupled to the display; and a second connector coupled to one end of a video and audio cable; wherein the microcontroller unit processes the number and transmits the number to a video and audio control device coupled to the other end of the video and audio cable; wherein the video and audio control device assigns corresponding video signals according to the number, so as to transmit the corresponding video signals to the display in the video wall.

10 Claims, 7 Drawing Sheets

(56) References Cited

U.S. PATENT DOCUMENTS

| | | | |
|---|---|---|---|
| 2007/0036158 A1* | 2/2007 | Hun-Kwon | G06F 13/4081 370/389 |
| 2009/0185637 A1* | 7/2009 | Mawatari | H04L 25/0272 375/295 |
| 2010/0174832 A1 | 7/2010 | Li et al. | |
| 2013/0293443 A1* | 11/2013 | Seo | G06F 3/1446 345/1.2 |
| 2015/0341611 A1 | 11/2015 | Oh et al. | |

FOREIGN PATENT DOCUMENTS

| | | |
|---|---|---|
| JP | 2008-281717 A | 11/2008 |
| TW | 201026020 A | 7/2010 |

OTHER PUBLICATIONS

Extended European Search Report, dated Mar. 14, 2018 in corresponding application EP 17182535.9.
Japanese Office Action, dated Feb. 6, 2018 in a counterpart Japanese patent application, No. JP 2016-184333.
Japanese Office Action, dated Aug. 21, 2018 in a counterpart Japanese patent application, No. JP 2016-184333.

\* cited by examiner

VIDEO ADAPTER FOR INSTALLING VIDEO WALL AND RELATED METHOD

BACKGROUND OF THE INVENTION

Field of the Invention

This invention relates to video adapters, and in particular, it relates to a video adapter for achieving fast installation of video walls and related method.

Description of Related Art

Video walls (also called TV walls) are widely used in advertisement boards, concerts, electronic billboards, etc. Because a video wall is typically formed of multiple display devices composed together, there is a large number of connection cables between the multiple display devices and the video switch which provides the video signals. When the cables between the video wall and the video switch need to be re-connected, the large number of cables may cause confusion in the connection order (e.g. which cable should be connected to which port of the video switch). Typically, the user needs to physically label the cables to indicate their corresponding display devices, making the process cumbersome. Moreover, if a connection mistake is made, it is time-consuming to identify the correct connection order.

Further, when an ordinary consumer needs to connect multiple video sources to a video switch, once the connection order of one or more video sources is changed, the consumer will need to re-adapt to the new order of the video sources relative to the video terminals of the television. The above-described problems of the connection between video wall and video switch and of the connection between the video switch and multiple video sources have long caused inconvenience to the user.

Therefore, there is a need to solve the above-described problems of the connection between video wall and video switch and of the connection between the video switch and multiple video sources.

SUMMARY

To solve the above-described problems of the connection between video wall and video switch and of the connection between the video switch and multiple video sources, embodiments of the present invention provide a video adapter for achieving fast installation of video walls and related method.

To achieve the above objects, the present invention provides a video adapter for fast installation of a video wall, which includes: a microcontroller unit; a number generator, coupled to the microcontroller unit, configured to set a sequence number for a display device among a plurality of display devices forming the video wall, and to transmit the sequence number to the microcontroller unit; a first connector, configured to be coupled to the display device; and a second connector, configured to be coupled to one end of a video cable; wherein the microcontroller unit processes the sequence number and transmits it to a video control device which is coupled to another end of the video cable; and wherein the video control device allocates a corresponding video signal based on the sequence number and transmits the video signal to the display device of the video wall.

In another aspect, the present invention provides a video adapter for fast installation of a video wall, which includes: a microcontroller unit; a number generator, coupled to the microcontroller unit, configured to set a sequence number for a display device among a plurality of display devices forming the video wall, and to transmit the sequence number to the microcontroller unit; a first connector, configured to be coupled to the display device; a second connector, configured to be coupled to one end of a video cable; and a first hot plug detect (HPD) line, coupled to the microcontroller unit, wherein the microcontroller unit determines a voltage level of the first HPD line, processes the sequence number based on the voltage level, and transmits the sequence number to a video control device coupled to another end of the video cable, and wherein the video control device allocates a corresponding video signal based on the sequence number and transmits the video control to the display device of the video wall.

In another aspect, the present invention provides a method of fast installation of a video wall, which includes: a number generator generating a sequence number and transmitting the sequence number to a microcontroller unit, wherein the sequence number is a sequence number of a display device of the video wall; the microcontroller unit processing the sequence number and transmitting it to a video control device; and the video control device allocating a corresponding video signal based on the sequence number and transmitting the video signal to the display device of the video wall.

An advantage of the present invention is that the user does not need to remember the order of the multiple video cables or put physical labels on the video cables; the user can directly connect the video cables from multiple display devices or from multiple video sources to the video control device in any arbitrary order.

It is to be understood that both the foregoing general description and the following detailed description with reference to the drawings are exemplary and explanatory and are intended to provide further explanation of the invention as claimed.

BRIEF DESCRIPTION OF THE DRAWINGS

The above aspects and other characteristics and advantages of the present invention will be described in detail by referring to the following drawings.

DETAILED DESCRIPTION OF PREFERRED EMBODIMENTS

Embodiments of the present invention are described in detail below. The descriptions are intended to explain the structure and method flow of the embodiments, which are intended for description purposes and do not limit the scope of the invention. In addition to the specific embodiments described herein, the invention may be applied in other embodiments.

Figure 1:
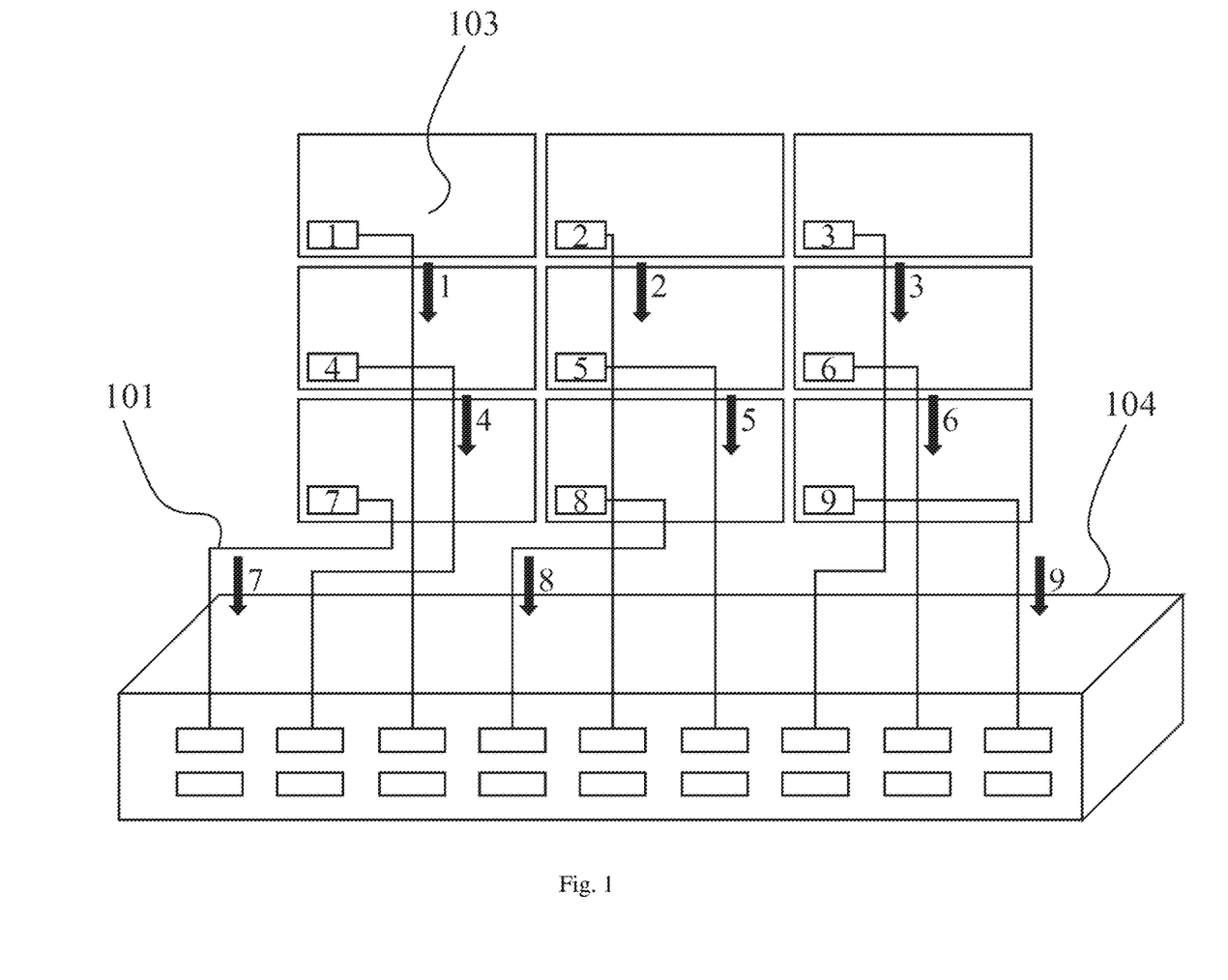
FIG. 1 schematically illustrates an application scenario of video adapter for fast installation of a video wall according to an embodiment of the present invention.

Embodiments of the present invention provide a video adapter for achieving fast installation of video walls and related method. Referring to FIG. 1, by using the video adapter of the present embodiments, the multiple display devices 103 of the video wall can be connected to the video control device 104 via video cables 101 in an arbitrary (i.e. undefined) order; there is no requirement for a particular connection order, i.e. no requirement for a particular correspondence between the display devices 103 and the ports of the video control device 104. Thus, the user does not need to remember the order of the multiple video cables 101 or put physical labels on the video cables 101; the user can directly connect the video cables 101 to the video control device 104 in any arbitrary order.

Figure 2:
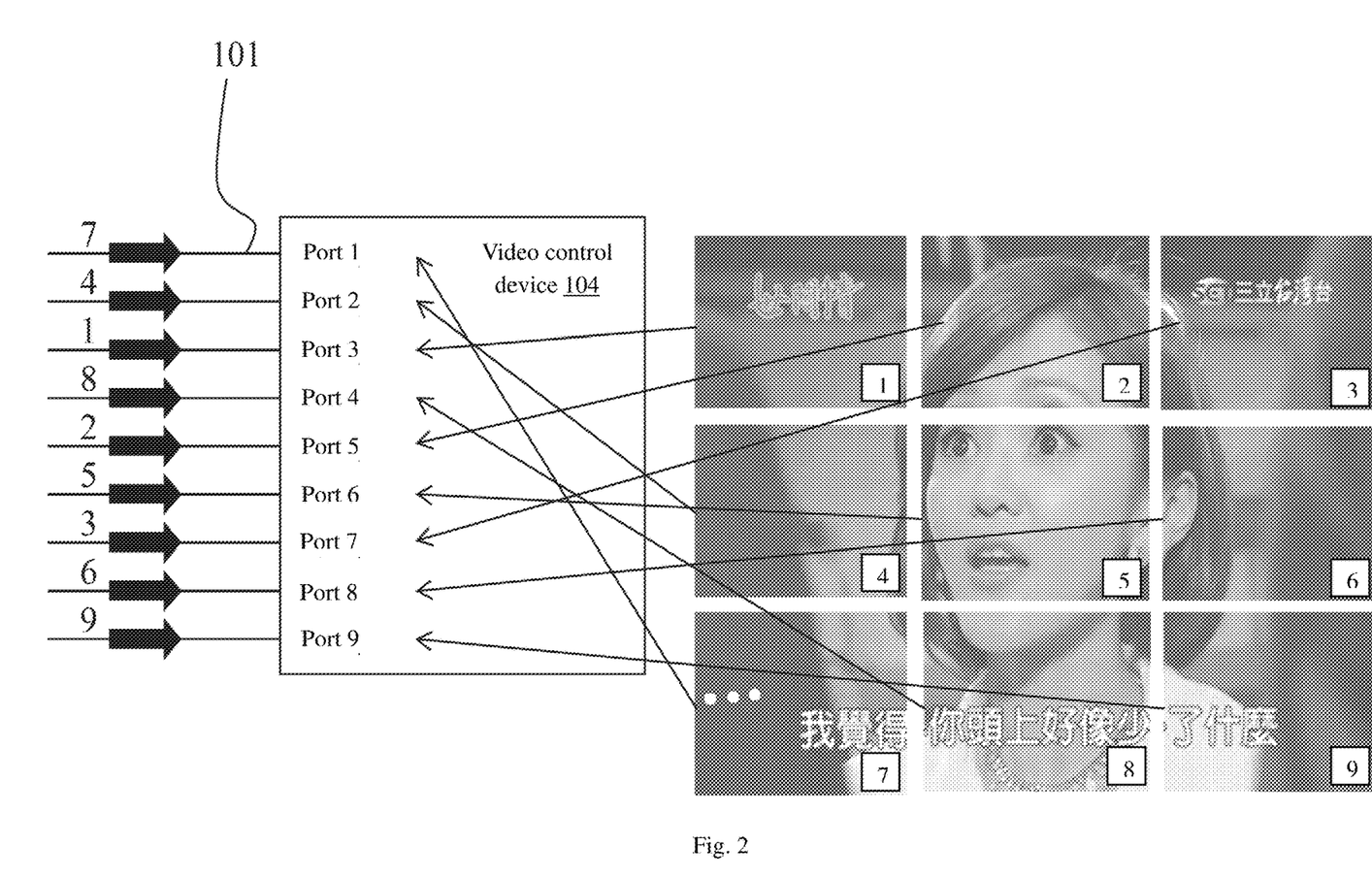
FIG. 2 schematically illustrates another application scenario of video adapters for fast installation of a video wall according to an embodiment of the present invention.

Referring to FIG. 2, as described above, the user can directly connect the video cables 101 to the video control device 104 in any arbitrary order. Even when the user directly connects the video cables 101 to the video control device 104 in an arbitrary order, the video control device 104 can allocate the correct video signals of the corresponding sub-images to the display devices based on the sequence numbers transmitted from the video adaptors. In FIG. 2, the multiple sub-images and their corresponding sequence numbers are shown on the right. For example, the display in the upper-right corner of the video wall matrix, which is numbered "1", is connected to the connection port 3 of the video control device 104, so the video control device 104 controls port 3 to output the correct sub-image that corresponds to display device 1. In some embodiments, the video cables 101 include without limitation HDMI (High Definition Multimedia Interface) cables or DVI (Digital Video Interface) cables.

Note here that the term "sequence number", or simply referred to as the "number" in this disclosure, is not limited to natural numbers or any particular numbering scheme; the term is used broadly to mean any identification scheme for identifying the position of the display devices in the video wall, so long as the definition is shared by the video control device 104 and all the video adapters. For example, the sequence number can use a pair of numbers (e.g. "1,1", "1,2", "3,3", etc.), or a representation that uses characters (e.g. "A1", "A2", "C3", etc.), or any suitable representation.

Figure 3:
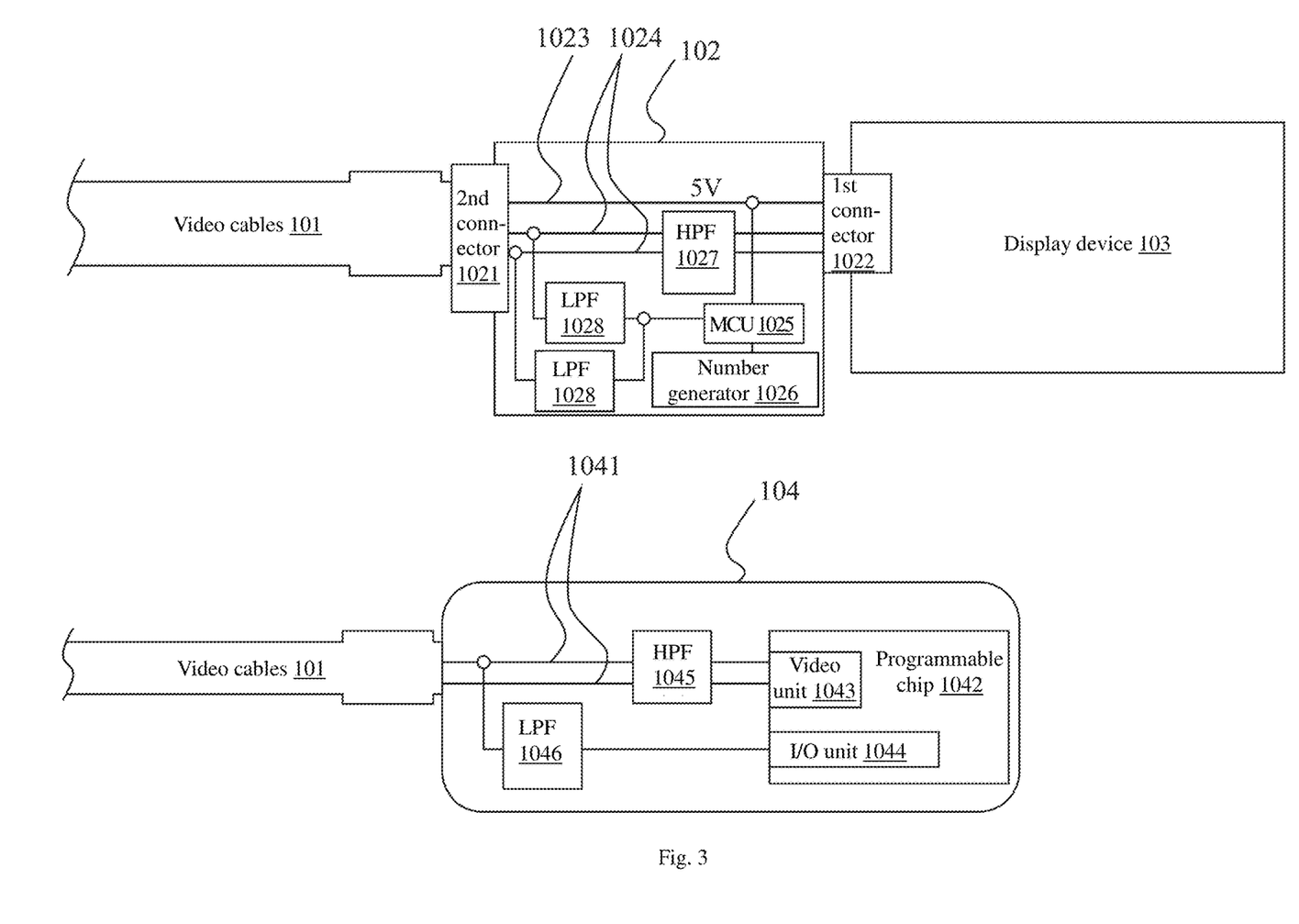
FIG. 3 is a block diagram of a video adapter for fast installation of a video wall according to an embodiment of the present invention.

FIG. 3 is a block diagram of a video adapter for fast installation of a video wall according to an embodiment of the present invention. As shown in FIG. 3, the video adapter 102 for fast installation of a video wall according to this embodiment includes a first connector 1022, a second connector 1021, a microcontroller unit 1025, a number generator 1026, a high-pass filter 1027 and low-pass filters 1028. The first connector 1022 is for coupling to the port of a display device 103. The second connector 1021 is for coupling to an end of a video cable 101. In one embodiment, the first connector 1022 and the second connector 1021 are, without limitation, connectors compliant with HDMI or DVI specifications. The video adapter 102 further includes a power line 1023 and video signal transmission lines 1024. The power line 1023 is coupled to the power wire of the video cable 101, and the video signal transmission lines 1024 are coupled to the video signal transmission lines of the video cable 101. The microcontroller unit 1025 is coupled to the power line 1023 which supplies power to the microcontroller unit 1025. In one embodiment, one low-pass filter 1028 is coupled between the microcontroller unit 1025 and each of the video signal transmission lines 1024, to prevent high frequency signals on the video signal transmission lines 1024 from entering the microcontroller unit 1025. In one embodiment, the above-referenced high frequency signal includes, without limitation, TMDS (Transition Minimized Differential Signaling) signals. In one embodiment, the high-pass filter 1027 is coupled on the video signal transmission lines 1024 to prevent low frequency signals on the video signal transmission lines 1024 from entering the display device 103.

The number generator 1026 is coupled to the microcontroller unit 1025. The number generator 1026 is used to set a sequence number for the display device 103 as one of the display devices of the video wall, and transmit the number to the microcontroller unit 1025. In one embodiment, the microcontroller unit 1025 processes the number, and transmits the number in a low frequency signal via the video signal transmission lines 1024 to the video control device 104 which is coupled to the other end of the video cable 101. The low frequency signal passes through the low-pass filters 1028 and is loaded onto and carried by the video signal transmission lines 1024 for transmission. Based on the number, the video control device 104 allocates a video signal of a corresponding sub-image and transmits the video signal to the display device 103 of the video wall. In one embodiment, the number generator 1026 may be, without limitation, a DIP switch or a unique number chip (e.g. a MAC address (Media Access Control address) chip). The DIP switch allows the user to manually set a number to generate the number for the display device. The unique number chip may pre-store (e.g. by burning) a unique number. When the number generator 1026 is a unique number chip, the number transmitted by the microcontroller unit 1025 is a unique number; when the video control device 104 receives the unique number, it first correlates the unique number to a sequence number of a corresponding display device, before allocating the corresponding video signal of a sub-image based on the sequence number. In one embodiment, the order of the numbers of the display devices is in accordance with the order of the numbers assigned to the image signals of the sub-images of the video wall. Note that when the number generator 1026 is a unique number chip, the video control device 104 needs to pre-store a correspondence between the unique number of each video adapter 102 and a sequence number representing the position of its connected display device in the video wall. Thus, the same video adapter 102 (with the unique number chip) should always be connected to the same display device 103, unless the correspondence information stored in the video control device 104 is updated to reflect any change. On the other hand, when a DIP switch is used, the user may manually set the sequence number of the DIP switch for a video adapter 102 when connecting it to a display device 103, based on the location of the display device 103 in the video wall. Thus, the same video adapter 102 does not have to be connected to the same display device 103, as long as the DIP switch is set correctly when making a connection.

In the block diagram in the upper portion of FIG. 3, because the low frequency signal is loaded onto and carried by the video signal transmission lines 1024, such as TMDS which is a differential signal, the low frequency signal also needs to be a differential signal, i.e., two symmetrical low frequency signals are respectively carried by the TMDS+ and TMDS− signal lines. In the block diagram in the lower portion of FIG. 3, which shows the video control device 104 connected to the video cable 101, because taking the low frequency signal from the video signal transmission lines does not affect the differential characteristics of the signal on the lines, the low frequency signal only needs to be taken from one of the TMDS+ and TMDS− signal lines. Thus, in the diagram in the upper portion of FIG. 3, two low-pass filters are provided, whereas in the diagram in the lower portion of FIG. 3, only one low-pass filter is provided. It should be noted that the numbers of components described above, such as the two low frequency signals, the two TMDS+ and TMDS− signals, one low-pass filter, two low-pass filters, or the two video signal transmission lines 1024 shown in FIG. 3, are all for purposes of illustration only and do not limit the scope of the invention.

As shown in FIG. 3, in one embodiment, the video control device 104 includes video signal transmission lines 1041, a programmable chip 1042, a high-pass filter 1045 and a low-pass filter 1046. The programmable chip 1042 includes a video unit 1043 and an input/output unit 1044. In one embodiment, the programmable chip 1042 includes, without limitation, an FPGA (field-programmable gate array). In one embodiment, the input/output unit 1044 includes, without limitation, a GPIO (general-purpose input/output). One end of the video signal transmission lines 1041 are coupled to the video signal transmission lines of the video cable 101, and the other ends of the video signal transmission lines 1041 are coupled to the video unit 1043 of the programmable chip 1042. The high-pass filter 1045 is coupled on the video signal transmission lines 1041, for preventing the low frequency signal from entering the video unit 1043 of the programmable chip 1042. Thus, the video unit 1043 receives high frequency signals, such as, without limitation, TMDS signals. The low-pass filter 1046 is coupled between one of the video signal transmission lines 1041 and the input/output unit 1044 of the programmable chip 1042, for preventing the high frequency signal from entering the input/output unit 1044. Thus, the input/output unit 1044 receives the low frequency signal described earlier. Based on the number contained in the low frequency signal, the input/output unit 1044 of the video control device 104 allocates the video signal of the corresponding sub-image, and transmits that video signal to the display device 103 of the video wall.

Figure 4:
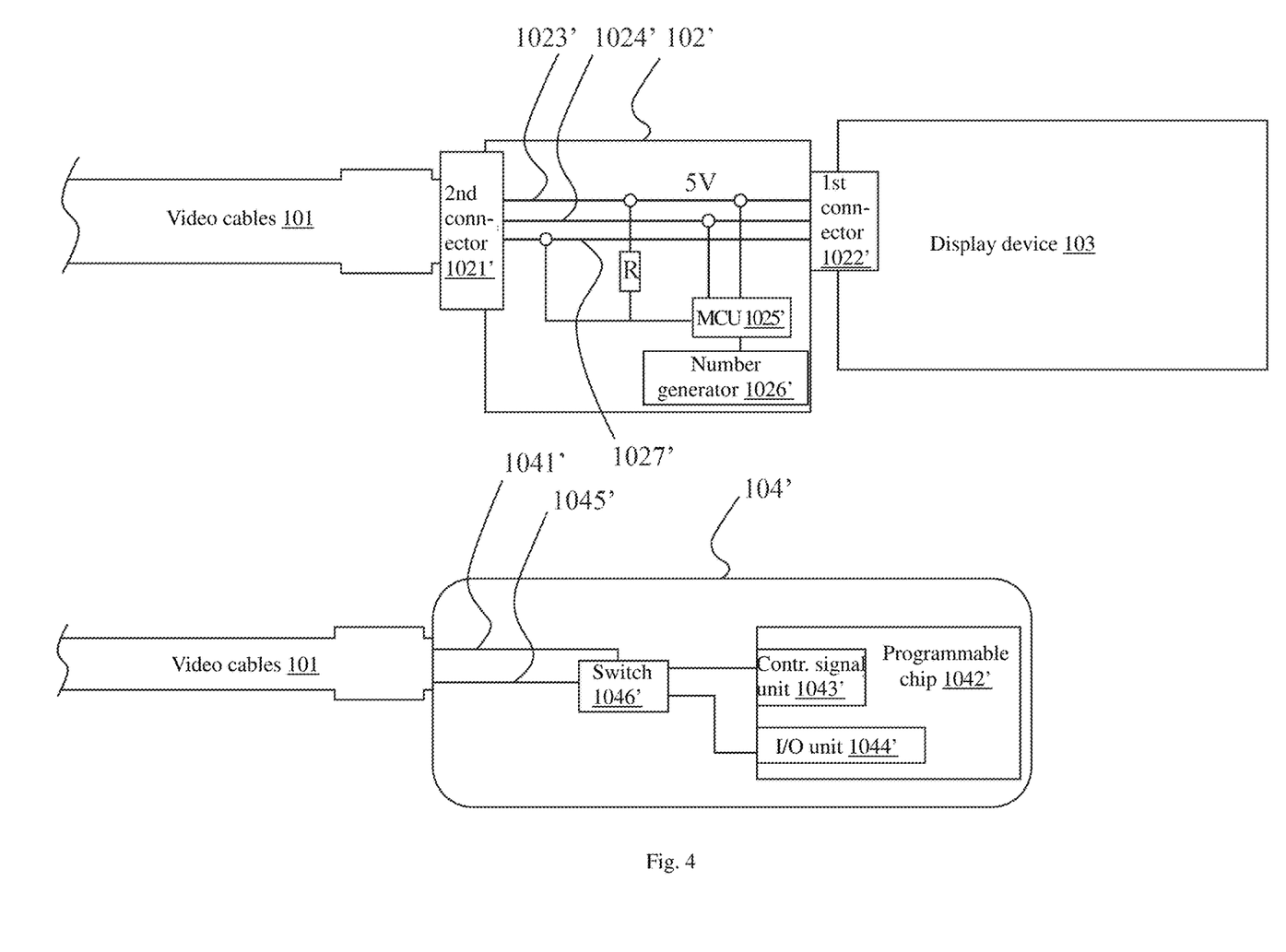
FIG. 4 is a block diagram of another video adapter for fast installation of a video wall according to another embodiment of the present invention.

FIG. 4 is a block diagram of another video adapter for fast installation of a video wall according to another embodiment of the present invention. As shown in FIG. 4, the video adapter 102' includes a first connector 1022', a second connector 1021', a microcontroller unit 1025', and a number generator 1026'. The first connector 1022' is coupled to a port of the display device 103. The second connector 1021' is coupled to one end of the video cable 101. The video adapter 102' further includes a power line 1023', a hot plug detect (HPD) line 1024', and a control line 1027'. The power line 1023' is coupled to the power line of the video cable 101; the HPD line 1024' is coupled to the HPD line of the video cable 101, and the control line 1027' is coupled to the control line of the video cable 101. The microcontroller unit 1025' is coupled to the power line 1023', the HPD line 1024' and the control line 1027'. The power line 1023' provides power to the microcontroller unit 1025'.

The number generator 1026' is coupled to the microcontroller unit 1025'. The number generator 1026' is used to set a sequence number for the display device 103 as one of the display device of the video wall, and transmit the number to the microcontroller unit 1025'. In one embodiment, the microcontroller unit 1025' determines the voltage level of the HPD line 1024', processes the number based on the voltage level, and transmits the number as a low frequency signal via the control line 1027' to the video control device 104' which is coupled to the other end of the video cable 101. The low frequency signal is carried by the control line 1027' for transmission. In one embodiment, when the microcontroller unit 1025' determines that the voltage level on the HPD line 1024' is a low level, the microcontroller unit 1025' processes the number and transmits the number as a low frequency signal via the control line 1027' to the video control device 104' at the other end of the video cable 101. Based on that number, the video control device 104' allocates a video signal of a corresponding sub-image and transmits the video signal to the display device 103 of the video wall. In one embodiment, the number generator 1026' may be, without limitation, a DIP switch or a unique number chip (e.g. a MAC address chip). The DIP switch allows the user to manually set a number to generate the number for the display device. The unique number chip may pre-store (e.g. by burning) a unique number. When the number generator 1026' is a unique number chip, the number transmitted by the microcontroller unit 1025' is a unique number; when the video control device 104' receives the unique number, it first correlates the unique number to a sequence number of a corresponding display device, before allocating the corresponding video signal of a sub-image to the display device. In one embodiment, as shown in FIG. 1 and FIG. 2, the order of the numbers of the display devices is in accordance with the order of the numbers assigned to the image signals for the sub-images of the video wall.

As shown in FIG. 4, in one embodiment, the video control device 104' includes a HPD line 1041', a control line 1045', a programmable chip 1042', and a switch 1046'. The programmable chip 1042' includes a control signal unit 1043' and an input/output unit 1044'. In one embodiment, the programmable chip 1042' includes, without limitation, an FPGA (field-programmable gate array). In one embodiment, the input/output unit 1044' includes, without limitation, a GPIO (general-purpose input/output). In one embodiment, the switch 1046' may be, without limitation, a one-input-two-output switch, where the control line 1045' is coupled to the input of the switch 1046', and the control signal unit 1043' and the input/output unit 1044' are respectively coupled to the two outputs of the switch 1046'; the HPD signal in the HPD line 1041' is used as a trigger signal for the switch 1046'. When the HPD signal in the HPD line 1041' is at a low voltage level, the switch 1046' switches the control line 1045' to the input/output unit 1044', to forward the low frequency signal to the input/output unit 1044'; when the HPD signal in the HPD line 1041' is at a high voltage level, the switch 1046' switches the control line 1045' to the control signal unit 1043', to forward the control signal to the control signal unit 1043'. In one embodiment, the control signal is, without limitation, a CEC (Consumer Electronics Control) signal. Based on the number contained in the low frequency signal, the input/output unit 1044' of the video control device 104' allocates the video signal of the corresponding sub-image, and transmits that video signal to the display device 103 of the video wall.

Figure 5:
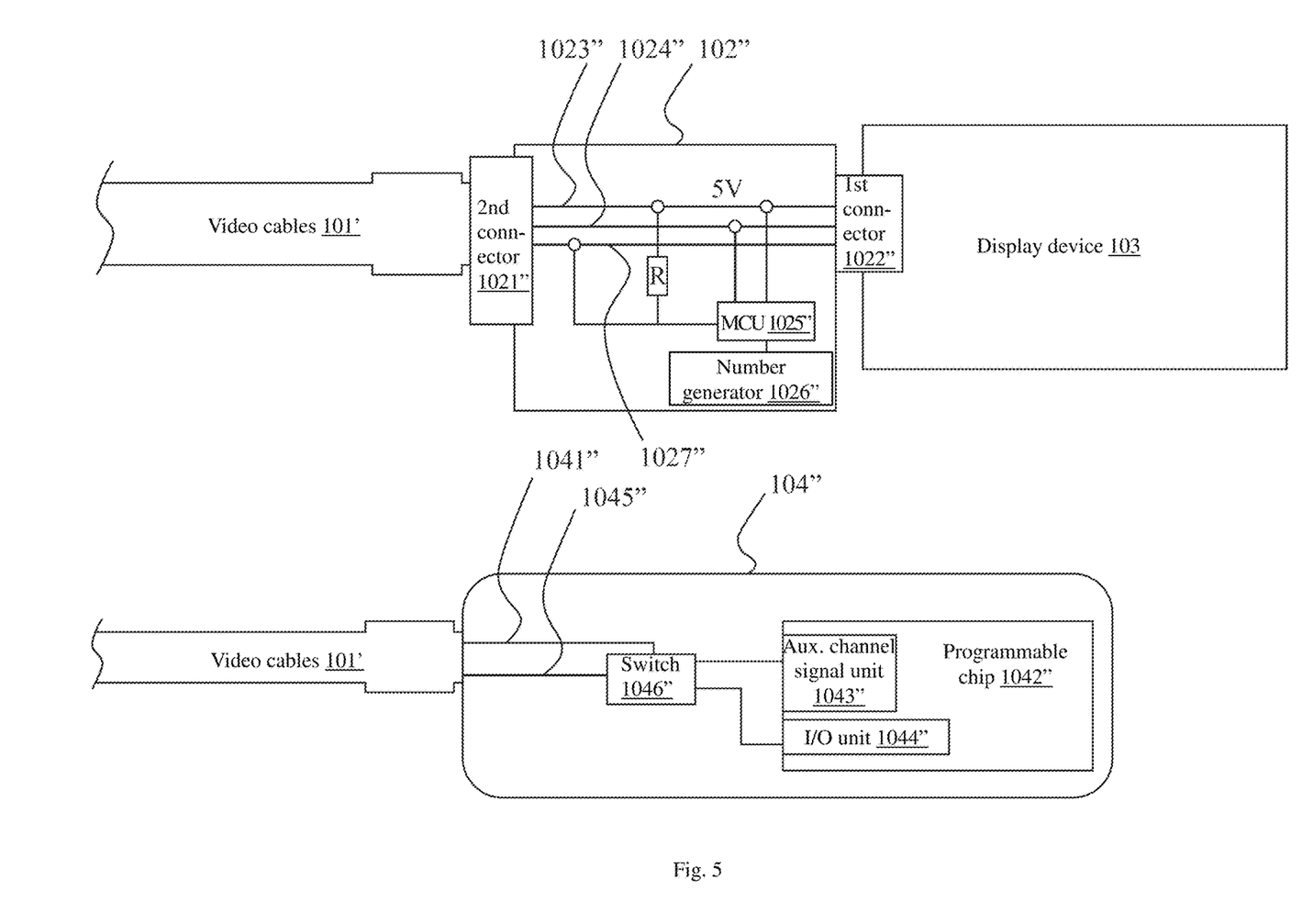
FIG. 5 is a block diagram of another video adapter for fast installation of a video wall according to another embodiment of the present invention.

FIG. 5 is a block diagram of another video adapter for fast installation of a video wall according to another embodiment of the present invention. As shown in FIG. 5, the video adapter 102" includes a first connector 1022", a second connector 1021", a microcontroller unit 1025", and a number generator 1026". The first connector 1022" is coupled to a port of the display device 103. The second connector 1021" is coupled to one end of the video cable 101'. In one embodiment, the video cable 101' is, without limitation, a Display Port (DP) cable. In one embodiment, the first connector 1022" and the second connector 1021" are, without limitation, connectors compliant with DP specifications. The video adapter 102" further includes a power line 1023", a HPD line 1024", and an auxiliary channel line 1027". The power line 1023" is coupled to the power line of the video cable 101'; the HPD line 1024" is coupled to the HPD line of the video cable 101', and the auxiliary channel line 1027" is coupled to the auxiliary channel line of the video cable 101'. The microcontroller unit 1025" is coupled to the power line 1023", the HPD line 1024" and the auxiliary channel line 1027". The power line 1023" provides power to the microcontroller unit 1025".

The number generator 1026" is coupled to the microcontroller unit 1025". The number generator 1026" is used to set a sequence number for the display device 103 as one of the display device of the video wall, and transmit the number to the microcontroller unit 1025". In one embodiment, the microcontroller unit 1025" determines the voltage level of the HPD line 1024", processes the number based on the voltage level, and transmits the number as a low frequency signal via the auxiliary channel line 1027" to the video control device 104" which is coupled to the other end of the video cable 101'. The low frequency signal is carried by the auxiliary channel line 1027" for transmission. In one embodiment, when the microcontroller unit 1025" determines that the voltage level on the HPD line 1024" is a low voltage level, the microcontroller unit 1025" processes the number, and transmits the number as a low frequency signal via the auxiliary channel line 1027" to the video control device 104" at the other end of the video cable 101'. Based on that number, the video control device 104" allocates a video signal of a corresponding sub-image and transmits the video signal to the display device 103 of the video wall. In one embodiment, the number generator 1026" may be, without limitation, a DIP switch or a unique number chip (e.g. a MAC address chip). The DIP switch allows the user to manually set a number to generate the number for the display device. The unique number chip may pre-store (e.g. by burning) a unique number. When the number generator 1026" is a unique number chip, the number transmitted by the microcontroller unit 1025" is a unique number; when the video control device 104" receives the unique number, it first correlates the unique number to a number of a corresponding display device, before allocating the corresponding video signal of a sub-image to the display device. In one embodiment, the order of the numbers of the display devices is in accordance with the order of the numbers assigned to the image signals for the sub-images of the video wall.

As shown in FIG. 5, in one embodiment, the video control device 104" includes a HPD line 1041", an auxiliary channel line 1045", a programmable chip 1042", and a switch 1046". The programmable chip 1042" includes an auxiliary channel signal unit 1043" and an input/output unit 1044". In one embodiment, the programmable chip 1042" includes, without limitation, an FPGA (field-programmable gate array). In one embodiment, the input/output unit 1044" includes, without limitation, a GPIO (general-purpose input/output). In one embodiment, the switch 1046" may be, without limitation, a one-input-two-output switch, where the auxiliary channel line 1045" is coupled to the input of the switch 1046", and the auxiliary channel signal unit 1043" and the input/output unit 1044" are respectively coupled to the two outputs of the switch 1046"; the HPD signal in the HPD line 1041" is used as a trigger signal for the switch 1046". When the HPD signal in the HPD line 1041" is at a low voltage level, the switch 1046" switches the auxiliary channel line 1045" to the input/output unit 1044", to forward the low frequency signal to the input/output unit 1044"; when the HPD signal in the HPD line 1041" is at a high voltage level, the switch 1046" switches the auxiliary channel line 1045" to the auxiliary channel signal unit 1043", to forward the auxiliary channel signal to the auxiliary channel signal unit 1043". In one embodiment, the auxiliary channel signal is, without limitation, an AUX signal of the Display Port specification. Based on the number contained in the low frequency signal, the input/output unit 1044" of the video control device 104" allocates the video signal of the corresponding sub-image, and transmits that video signal to the display device 103 of the video wall.

Figure 6:
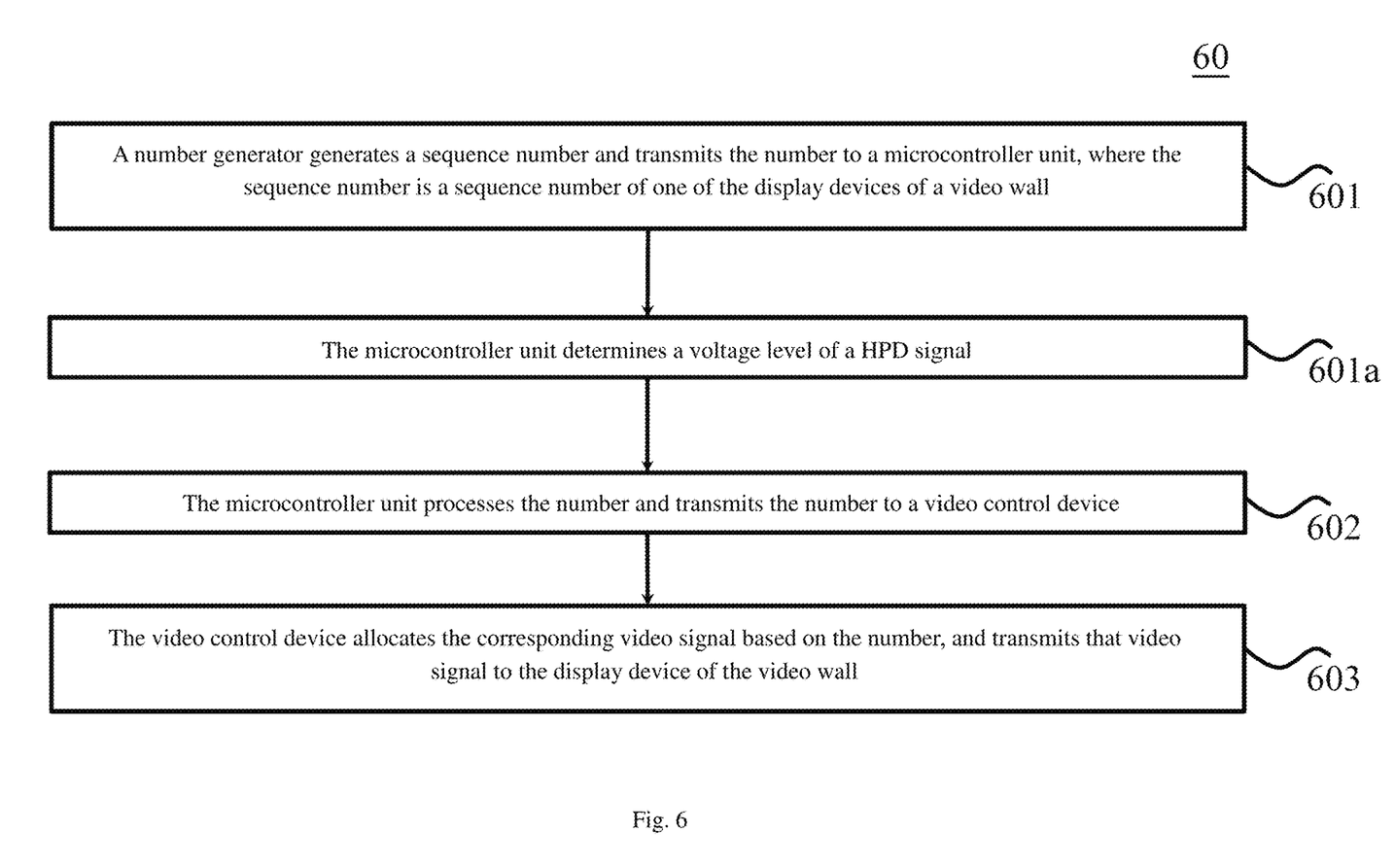
FIG. 6 is a flowchart showing a method of fast installation of a video wall according to another embodiment of the present invention.

FIG. 6 is a flowchart showing a method of fast installation of a video wall according to another embodiment of the present invention. The method 60 of fast installation of a video wall includes step 601: a number generator generates a sequence number and transmits the number to a microcontroller unit, where the sequence number is a sequence number of one of the display devices of a video wall. In one embodiment, the method 60 optionally includes step 601*a*: the microcontroller unit determines a voltage level of a HPD signal; if the voltage level of the HPD signal is a low level, continue to perform step 602. Then, in step 602, the microcontroller unit processes the number and transmits the number to a video control device. Then, in step 603, the video control device allocates the corresponding video signal based on the number, and transmits that video signal to the display device of the video wall.

Figure 7:
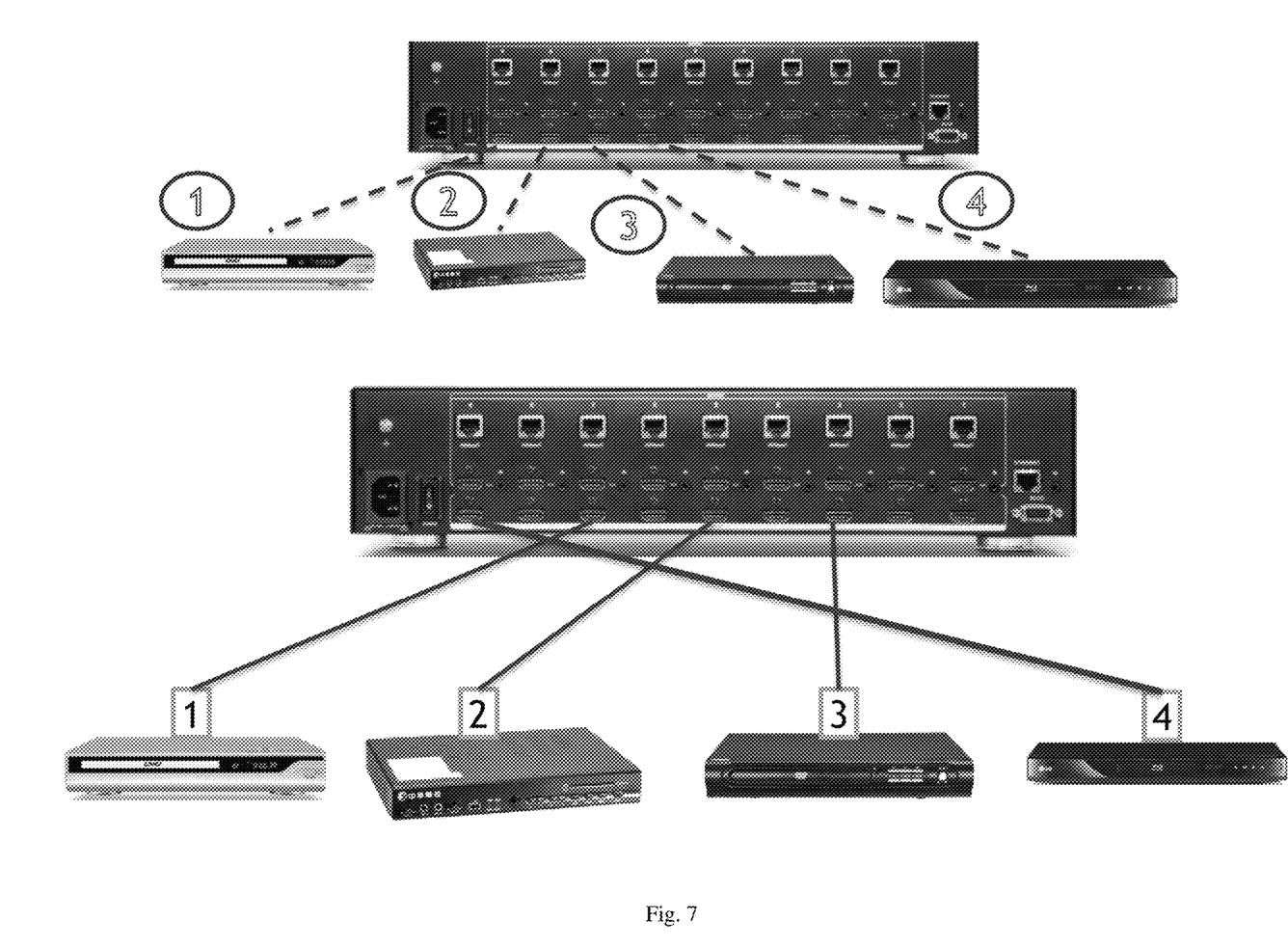
FIG. 7 schematically illustrates another application scenario of a video adapter for fast installation of a video wall according to an embodiment of the present invention.

As discussed above, using the video adapter and method of the embodiments of the present invention, the user does not need to remember the order of the multiple video cables 101 or 101' or put physical labels on the video cables 101 or 101'; the user can directly connect the video cables 101 or 101' between the video control device 104 and the display devices 103 of the video wall in any arbitrary order. Similarly, as shown in FIG. 7, the video adapter and method can also be used between a video control device and video source devices. The upper portion of FIG. 7 shows a connection order that the user is familiar with; the lower portion of FIG. 7 shows that using the video adapter and method of the present embodiments, even though the connection order of the video cables has changed, the user does not need to become familiar with the new positions of the video source devices; rather, the video control device can use the numbers of the video sources transmitted from the video adapters to allocate the video signals from the multiple video sources to the corresponding display ports. In one embodiment, the order of the numbers of the ports of the display device is in accordance with the order of the numbers of the video sources, e.g., a port which the video source numbered 2 is plugged into (arbitrarily) will be numbered port 2 accordingly.

It will be apparent to those skilled in the art that various modification and variations can be made in the video adapter device and related method of the present invention without departing from the spirit or scope of the invention. Thus, it is intended that the present invention cover modifications and variations that come within the scope of the appended claims and their equivalents.

What is claimed is:

1. A video adapter for fast installation of a video wall, comprising:
   a microcontroller unit;
   a number generator, coupled to the microcontroller unit, configured to generate a number for a display device among a plurality of display devices forming the video wall, and to transmit the number to the microcontroller unit;

a first connector, configured to be coupled to the display device; and a second connector, configured to be coupled to one end of a video cable;

a pair of differential video signal transmission lines, coupled between the first connector and the second connector, and configured to transmit differential video signals as high frequency signals from the second connector to the first connector;

wherein the microcontroller unit processes the number and transmits it, as a low frequency signal via at least one of the pair of differential video signal transmission lines and via the second connector to a video control device which is coupled to another end of the video cable.

2. The video adapter of claim 1, further comprising a first low-pass filter coupled between the at least one of the pair of differential video signal transmission lines and the microcontroller unit, for preventing high frequency signals on the at least one of the pair of differential video signal transmission lines from entering the microcontroller unit.

3. A video system comprising the video adapter of claim 2, further comprising the video control device coupled to the other end of the video cable, wherein the video control device is configured to allocate a corresponding video signal based on the number transmitted by the microcontroller unit, and to transmit the video signal to the video adapter via the video cable, wherein the video control device includes a second pair of differential video signal transmission lines, wherein the video control device includes a programmable chip coupled to at least one of the second pair of differential video signal transmission lines, wherein the programmable chip includes an input/output unit, wherein the video control device further includes a second low-pass filter coupled between the input/output unit and the at least one of the second pair of differential video signal transmission lines, for preventing the high frequency signal from entering the input/output unit, wherein the input/output unit receives the low frequency signal.

4. The video system of claim 3, wherein the programmable chip further includes a video unit, the video control device further includes a second high-pass filter coupled on the at least one of the second pair of differential video signal transmission lines before the video unit, for preventing the low frequency signal from entering the video unit.

5. The video adapter of claim 2, further comprising a high-pass filter coupled on the at least one of the pair of differential video signal transmission lines, for preventing the low frequency signal from entering the display device.

6. The video adapter of claim 1, wherein the number generator is a DIP switch or a unique number chip having a unique number pre-stored in it.

7. A method of fast installation of a video wall having a plurality of display devices, comprising:

a number generator associated with each one of the plurality of display devices of the video wall generating a number and transmitting the number to a microcontroller unit associated with the display device, wherein the number is a number of the display device;

the microcontroller unit associated with each one of the plurality of display devices processing the number and transmitting it to a video control device directly as a low frequency signal via at least one of a pair of differential video signal transmission lines of a video cable which is connected between the corresponding display device and the video control device; and the video control device allocating a corresponding one of a plurality of video signals to each one of the plurality of display devices, wherein the allocation for each display device is based on the number received from the microcontroller unit associated with the display device without regard to any signals received from any other microcontroller associated with any other one of the display devices of the video wall, and transmitting the plurality of video signals to the corresponding plurality of display devices of the video wall according to the allocation, by transmitting each video signal as high frequency signals over the pair of differential video signal transmission lines of the corresponding video cable.

8. The method of claim 7, further comprising, before the microcontroller unit processing and transmitting the number:

the microcontroller unit determining a voltage level of a hot plug detect signal line of the corresponding video cable.

9. The method of claim 7, further comprising:

connecting the plurality of display devices to the video control device with the video cables in an undefined order.

10. The method of claim 7, wherein the microcontroller unit transmits the number to the video control device via video signal transmission lines, or a control line, or an auxiliary channel line, of a video cable.

* * * * *